(12) United States Patent
Dodd et al.

(10) Patent No.: US 9,137,488 B2
(45) Date of Patent: *Sep. 15, 2015

(54) VIDEO CHAT ENCODING PIPELINE

(71) Applicant: Google Inc., Mountain View, CA (US)

(72) Inventors: Michael Dodd, Seattle, WA (US); Rodrigo Carceroni, Mountain View, CA (US)

(73) Assignee: Google Inc., Mountain View, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 13/661,924

(22) Filed: Oct. 26, 2012

(65) Prior Publication Data

US 2014/0118477 A1    May 1, 2014

(51) Int. Cl.
  *H04N 7/14* (2006.01)
  *H04N 7/15* (2006.01)
  (Continued)

(52) U.S. Cl.
  CPC ................ *H04N 7/15* (2013.01); *G06T 3/4092* (2013.01); *H04L 65/403* (2013.01); *H04L 65/605* (2013.01); *H04N 9/67* (2013.01); *H04N 21/25825* (2013.01); *H04N 21/2662* (2013.01); *H04N 21/41407* (2013.01); *H04N 21/4788* (2013.01)

(58) Field of Classification Search
  CPC ......... H04M 2203/50–2203/509; H04L 12/00; H04L 12/18; H04L 29/02; H04L 65/403; H04L 65/605; G06T 3/4092; H04N 9/67; H04N 21/25825; H04N 21/2662; H04N 21/41407; H04N 21/4788
  USPC .................... 348/14.01–14.16; 370/259–271, 370/351–357; 709/201–207, 217–248
  See application file for complete search history.

(56) References Cited

U.S. PATENT DOCUMENTS 5,852,472 A  * 12/1998 Prasad et al. ................... 348/552
6,215,515 B1 *  4/2001 Voois et al. ................ 348/14.01
(Continued)

FOREIGN PATENT DOCUMENTS

EP          1126709 A1      8/2001

OTHER PUBLICATIONS

Non-Final Office Action dated May 30, 2013, U.S. Appl. No. 13/769,188, filed Feb. 15, 2013, pp. 1-17.
(Continued)

*Primary Examiner* — Hemant Patel
(74) *Attorney, Agent, or Firm* — McDonnell Boehnen Hulbert & Berghoff LLP

(57) ABSTRACT

Implementations relate to a system for video encoding and conversion including an image resolution conversion component operable to convert a resolution of a source image frame from a first resolution to a second resolution to produce a first intermediate image frame at the second resolution; an image conversion component operable to receive the first intermediate image frame and convert an image size of the first intermediate image frame to another image frame size to produce a first viewable image frame; an image viewer component operable to display the first viewable image on a first display; a color space conversion component comprising a luminance conversion component and a chrominance operable to receive the first viewable image frame and convent a first luminance value and a first chrominance value of the first viewable image frame to a second intermediate image frame having a second luminance value and a second chrominance value.

27 Claims, 6 Drawing Sheets

(51) Int. Cl.
*H04N 9/67* (2006.01)
*G06T 3/40* (2006.01)
*H04N 21/258* (2011.01)
*H04N 21/2662* (2011.01)
*H04N 21/414* (2011.01)
*H04N 21/4788* (2011.01)
*H04L 29/06* (2006.01)

(56) References Cited

U.S. PATENT DOCUMENTS

| | | | |
|---|---|---|---|
| 6,941,025 B2 * | 9/2005 | Greenfield et al. | 382/260 |
| 7,148,911 B1 * | 12/2006 | Mitsui et al. | 348/14.01 |
| 7,339,993 B1 | 3/2008 | Brooks et al. | |
| 7,535,484 B2 * | 5/2009 | Lessing et al. | 348/14.01 |
| 7,639,263 B2 * | 12/2009 | Karlov et al. | 345/589 |
| 8,284,232 B2 * | 10/2012 | Biggs et al. | 348/14.08 |
| 2002/0180867 A1 | 12/2002 | Adair et al. | |
| 2003/0151610 A1 * | 8/2003 | Kuriakin et al. | 345/589 |
| 2004/0017477 A1 | 1/2004 | Cooper et al. | |
| 2010/0165198 A1 | 7/2010 | Abe et al. | |
| 2010/0202689 A1 | 8/2010 | Currivan et al. | |
| 2011/0279634 A1 | 11/2011 | Periyannan et al. | |

OTHER PUBLICATIONS

PCT International Search Report dated Nov. 11, 2013, PCT application No. PCT/US2013/059166 filed Sep. 11, 2013, pp. 1-12.

"User's Guide for Polycom HDX Room Systems," Jul. 31, 2012, XP055085409, Retrieved from the Internet: URL: http://www.polycom.de/content/dam/polycom/common/documents/guides/hdx-room-user-qrg-enus.pdf, pp. 1-56.

* cited by examiner

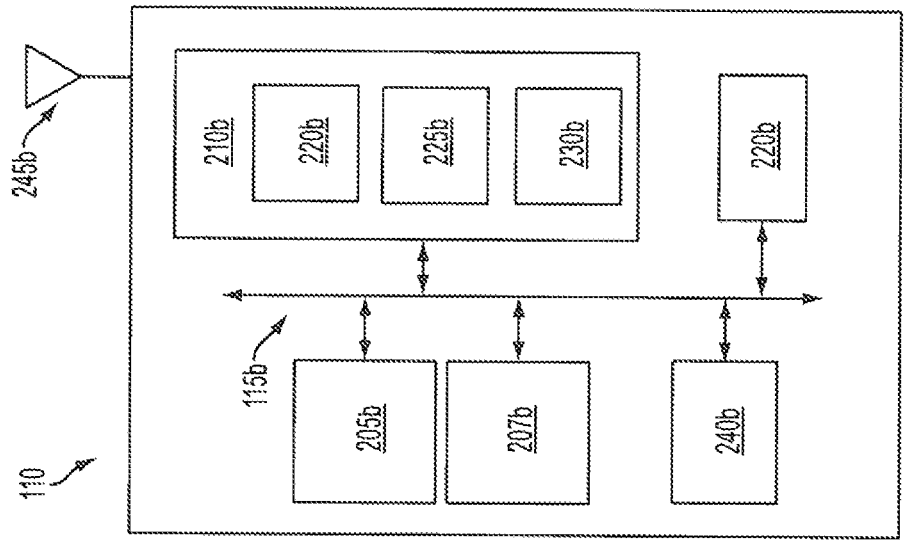
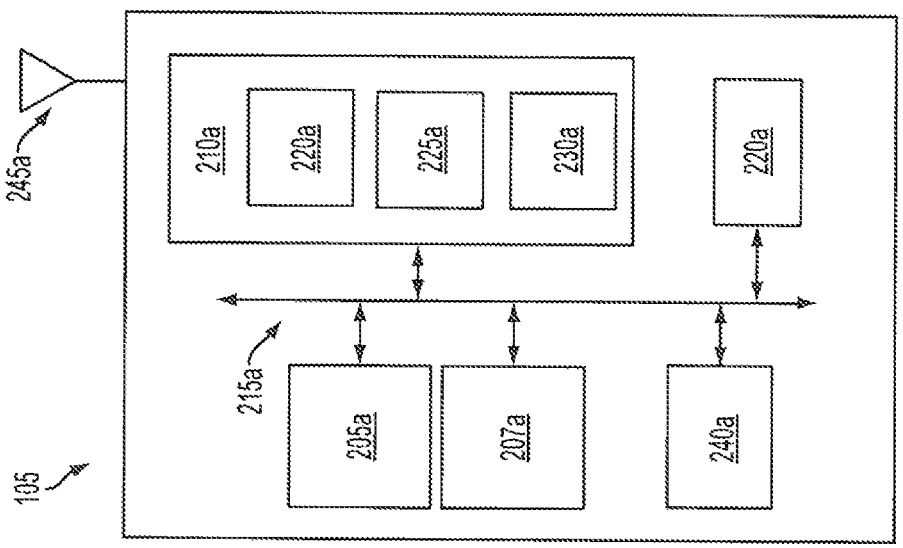
FIG. 2

VIDEO CHAT ENCODING PIPELINE

FIELD

Aspects of the present disclosure relate to methods, devices, and computer readable medium for video encoding.

BACKGROUND

With the popularity and abundance of mobile computing devices with camera functionality ever increasing, video conferencing and video chat are becoming important services to be provided by the mobile computing platform. However with this abundance of different mobile computing devices with varied processor, camera, and display capabilities, conventional video conferencing and video chat applications are not easily customizable to improve the user experience. For example, one type of device may be able to display a higher quality or resolution video, while another may not. A higher quality or resolution video encoded and transmitted to a device that is not capable of supporting that quality or resolution can present a number of disadvantages to either the device itself and/or to the network that is supporting the devices. What is needed is an improved mechanism for encoding video for video chat or video conferencing.

SUMMARY

In implementations, a system is disclosed that can comprise a memory operable to store computer-executable components; and a processor operable to execute the computer-executable components stored within the memory, the computer-executable instructions comprising: an image resolution conversion component operable to convert a resolution of a source image frame from a first resolution to a second resolution to produce a first intermediate image frame at the second resolution; an image conversion component operable to receive the first intermediate image frame and convert a vertical or a horizontal image size of the first intermediate image frame to another vertical or another horizontal image frame size to produce a first viewable image frame; an image viewer component operable to receive and display the first viewable image frame from the image conversion component on a first display; a color space conversion component comprising a luminance conversion component and a chrominance operable to receive the first viewable image frame and convert a first set of luminance values and a first set of chrominance values of the first viewable image frame to a second intermediate image frame having a second set of luminance values and a second set of chrominance values; an encoder component operable to encode the second intermediate image frame to be displayed on a second display.

In implementations the set of chrominance values and the set of luminance values can be represented as a 2-dimensional plane of values.

In implementations, the processor comprises a graphics processing unit.

In implementations, the system can further comprise a first input buffer operable to store the source image frame, a second input buffer operable to store the first intermediate image frame, a third input frame buffer operable to store the first viewable image frame, a fourth input frame buffer operable to store one or more luminance values for the luminance conversion and a fifth input frame buffer operable to store one or more chrominance values for the chrominance conversion.

In implementations, the system can further comprise an image rotation component operable to rotate the source image frame for a first orientation to a second orientation.

In implementations, the first luminance value can be encoded in an ARGB color space and the second luminance value can be encoded in a pixel including four bands to store intensity values.

In implementations, the second display can instruct the processor as to what format the encoder component encodes the second intermediate image frame.

In implementations, the image resolution conversion component can be operable to receive the source image frame from a camera coupled to a mobile communication device operating in preview mode.

In implementations, a system is disclosed that can comprise a memory operable to store computer-executable components; and a processor operable to execute the computer-executable components stored within the memory, the computer-executable instructions comprising: an image conversion component operable to convert a vertical or a horizontal image size of a source image frame to another vertical or another horizontal image frame size to produce a first intermediate image frame; an image resolution conversion component operable to receive the first intermediate image frame and convert a resolution of the first intermediate image frame from a first resolution to a second resolution to produce a first viewable image frame at the second resolution; an image viewer component operable to receive and display the first viewable image frame from the image resolution conversion component on a first display; a color space conversion component comprising a luminance conversion component and a chrominance operable to receive the first viewable image frame and convert a first luminance value and a first chrominance value of the first viewable image frame to a second intermediate image frame having a second luminance value and a second chrominance value; an encoder component operable to encode the second intermediate image frame to be displayed on a second display.

In implementations, the processor comprises a graphics processing unit.

In implementations, the system can further comprise an image rotation component that can be operable to rotate the source image frame for a first orientation to a second orientation.

DESCRIPTION OF DRAWINGS

The accompanying drawings, which are incorporated in and constitute a part of this specification, illustrate implementations of the present teachings and together with the description, serve to explain the principles of the present teachings.

FIG. 2 shows a more detailed view of the devices 105 and 110 of FIG. 1 in accordance with implementations of the present disclosure.

DETAILED DESCRIPTION

Figure 1:
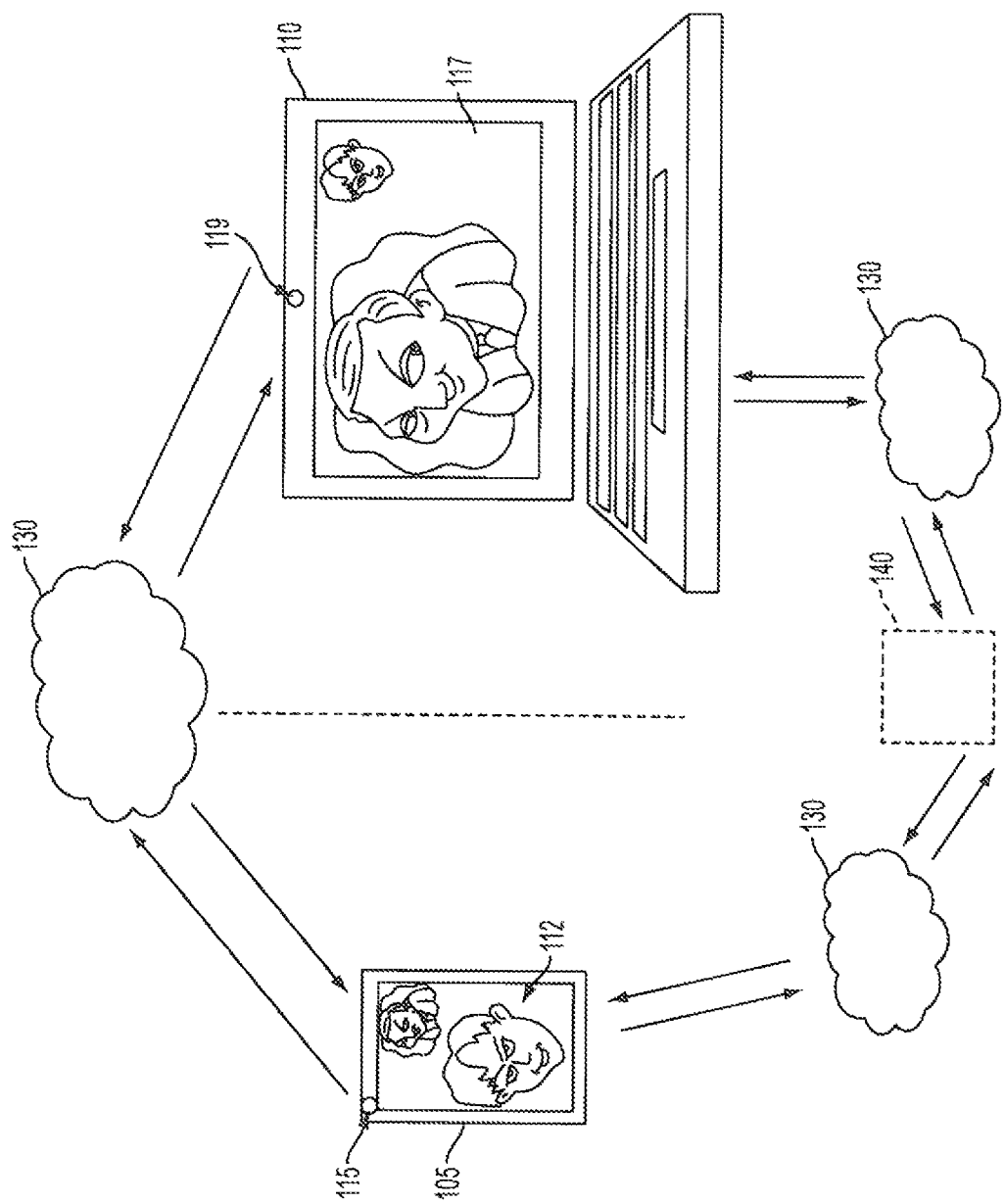
FIG. 1 shows an example use scenario according to implementations of the present disclosure.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

FIG. 1 shows an example use scenario according to implementations of the present disclosure where two users are shown engaged in a video chat or video conferencing session. A first user uses device 105 and a second user uses device 110. As shown, device 105 is in the form of a cellular or smart phone and includes front-facing camera 115 and display 112 and device 110 is in the form of a laptop computer and includes front-facing camera 119 and display 117. The forms of device 105 and 110 are merely exemplary and other device forms can be used. As shown in the video chat scenario, the person with whom the user is communicating with occupies the largest portion of the display 112, 117, while the user of the respective device generally occupies a much smaller portion of the display. Device 105 and 110 can communicate over network 130. In most video chat scenario, devices 105 and 110 will typically be different types of computers or communication devices with each having different display characteristics and capabilities. Although only two devices are shown, it will be apparent that a user can video chat with more one other user and that each additional user's device can have its own characteristic processing and display capabilities.

In implementations, devices 105 and 110 can be operable to function as client devices and be operable to communicate with server 140. By way of a non-limiting example of this implementation, devices 105 and/or 110 can be operable to perform at least a portion of the video processing for the video chat application. In another example, server 140 can be operable to perform at least a portion of the video processing and be operable to communicate the results of the processing to devices 105 and/or 110.

By way of a non-limiting example, device 105 can be notified directly over network 130, or through server 140, that device 110 would like to engage in a video conference or video chat session. Device 110 can transmit a video conference request along with information relating to the processing and/or display capabilities of device 110 to device 105 directly over network 130, or through server 140. Device 105 can acknowledge receipt of request by transmitting information to device 110 to begin the video conference session. During video conference session between device 105 and 110, another device may be operable to join the session. The other device can transmit similar processing and/or display capability information to any, or combinations of, device 105, 110 over network 130, or through server 140. Device 105 can transmit video information in a format configured for device 110 based on the processing and/or display capabilities of device 110 and transmit video information in a format configured for the other device based on the processing and/or display capabilities of the other device.

Various components in devices 105, 110 or server 140 can be configured to process image and/or video frames (e.g., graphic data) captured by a hardware component (e.g., a camera or a display) that produces an image frame (e.g., a video frame) in one color space format and at one image and/or video quality or resolution and convert between different to another color space format and another image and/or video quality or resolution. Devices 105, 110 or server 140 can be operable to convert between different color space formats and/or quality or resolution parameters to satisfy requirements of various components on devices 105 and/or 110. For example, camera frame data (e.g., a source image) can be delivered from a memory (e.g., a buffer). At device 105, the source image can be delivered in a particular color space format at a certain resolution (e.g., a resolution implemented by a camera preview mode). The source image can also be a delivered in a natural orientation of the camera (e.g., a landscape orientation or a portrait orientation). However, device 110 may require a source image in a different size, and/or orientations.

The conversion between different color space formats, quality, and/or resolution can be performed using circuitry and/or instructions stored or transmitted in a computer readable medium of devices 105, 110, and/or server 140 in order to provide improved processing speed, processing time, memory bandwidth, image quality and/or system efficiency.

There are different methods for representing color and intensity information in a video image. The video format that a file, a buffer in memory, or on a network, uses to store this information is also known as the pixel format. When you convert a file to a specific media format, some pixel formats are recommended over other to maintain high content quality. There are, for example, a variety of types of pixel format including, but not limited to, YUV (Luma and Chrominance), RGB (Red, Green, and Blue), CMYK (Cyan, Magenta, Yellow, and key (black), HSV (Hue, Saturation, and Value), HSB (Hue, Saturation, and Brightness), HSI (Hue, Saturation, and Intensity).

In image and/or video processing, there are various YUV color space formats. YUV color space formats can include, for example, subsampled formats and non-subsampled formats (e.g., full resolution data). Each YUV color space format can include a luminance component and a chrominance component. The luminance component contains brightness information of an image frame (e.g., data representing overall brightness of an image frame). The chrominance component contains color information of an image frame. Often times, the chrominance component is a subsampled plane at a lower resolution. Sampled formats in YUV can be sampled at various sub-sampling rates, such as 4:2:2 and 4:2:0. For example, a sub-sampling rate of 4:2:2 represents a sampling block that is four pixels wide, with two chrominance samples in the top row of the sampling block, and two chrominance samples in the bottom row of the sampling block. Similarly, a sub-sampling rate of 4:2:0 represents a sampling block that is four pixels wide, with two chrominance samples in the top row of the sampling block, and zero chrominance samples in the bottom row of the sampling block. Frequently, it is necessary to convert between different YUV color space formats to satisfy requirements for a particular hardware or software component. For example, a hardware component (e.g., a camera or a display) can produce an image frame in one YUV color space format, and another component (e.g., a hardware component or a software component) can require the image frame in another YUV color space format.

YUV (YCbCr) formats are subdivided into two more groups: packed and planar. In the packed format, the Y, U (Cb), and V (Cr) components or samples are packed together into macropixels (two pixels stored in one unsigned integer value), which are stored in an array. Conversely, the planar format stores these components in three separate arrays and combines the planes to form the image. For example, IYUV/

I420 (planar 4:2:0 or 4:1:1) pixel format comprises an N×NY plane followed by (N/2)×(N/2) U and Y planes. This format draws a top-down image (for example, the first line is at the top of the screen). The YVYV12 (planar 4:2:0 or 4:1:1) is identical to IYUV/1420 except that the U and V planes are switched. YYYY refers to a pixel where all four bands are used to store intensity values.

The variations in the different YUV samples are based on how data is sampled, both in the horizontal and vertical directions. The horizontal subsampling interval describes how frequently across a line that a sample of that component is taken, and the vertical interval describes on which lines sampled are taken. For example, if the format has a horizontal subsampling period of 2 for both the U and V components, it indicates that U and V samples are taken for every second pixel across a line. If the vertical subsampling period is 1, it indicates that U and V samples are taken on each line of the image.

For RGB pixel format, the primary colors in color video are red, green, and blue (RGB). RGB is often used to describe a type of video color-recording scheme and the type of equipment that uses it. It also describes a type of computer color display output signal comprising separately controllable red, green, and blue signals (as opposed to composite video, in which signals are combined before output). An A band or alpha value (transparency) can be added to the RGB pixel format, which is then called ARGB, which is the same as the RGBA pixel format, except that the A band (transparency) is placed before the Red, Green and Blue band values.

By way of a non-limiting example, direct conversion between different YUV color space formats can be implemented by separately converting luminance (e.g., luma) and chrominance (e.g., chroma) components of an image frame. Additionally, the image frame can be scaled and/or rotated. Therefore, processing time to convert between different YUV formats color spaces can be reduced. As such, the data rate required to achieve desired output quality can be reduced. Additionally, the amount of memory bandwidth to convert between different YUV color space formats can be improved.

Image and/or video data obtained by camera 115, 119, respectively, can be stored in one or more memory buffers as one or more frame buffers or as one or more textures and each buffer can be independently cropped, rotated, and mirrored as well as scaled during image processing. A texture may be purely a depth texture, an alpha texture, a RGB texture, and an alpha RGB (ARGB) texture. A RGB texture may comprise RGB components only. An ARGB texture may comprise RGB components as well as alpha components.

The dimensions of the textures can vary according to several inputs, for example, including camera preview size, effects being used, and desired output size. The camera preview size is a fixed size according to the camera drivers for a particular camera and can be different on different devices or even with different cameras on the same device. Some effects, such as clipping effects including image stabilization or virtual camera operator, can change the size of the image or video. So it is possible to provide the effect with a larger input image than what is expected on the output. Otherwise a technique can end up scaling the image up before encoding, which can be a waste of processing time and bandwidth. Device output size is a function of various factors including CPU capabilities of the device, remote device capabilities, and server-based requests. For example, based on the device's CPU capabilities, the resolution the device can support can vary between makes and models of the device. Even devices of the same make, may have very different resolution capabilities. Moreover, if the device to which the video is being sent has a maximum resolution, then that maximum resolution may define an upper limit on the resolution can be that can be encoded and transmitted. In social networking services, device 105 can transmit a particular resolution, for example, 480×300, but if, for example, server 140 detects that no one is requesting higher resolution, server 140 can sent a request to device 105 asking for 320×200. Later, if device 110 or another device initiates a video chat, server 140 can send a request to device 105 for higher resolution, for example, 480×300.

FIG. 2 shows a more detailed view of the devices 105 and 110 of FIG. 1 in accordance with implementations of the present disclosure. In implementations, devices 105 and 110 can include one or more central processing units (CPUs) 205a, 205b, respectively, one or more graphical processing units (GPUs) 207a, 207b, respectively, and system memory 210a, 210b, respectively. Bus 215a, 215b can be used for communicating between CPUs 205a, 205b, respectively, GPUs 207a, 207b, respectively, and system memory 210a, 210b, respectively. Depending on the desired configuration, CPUs 205a, 205b and GPUs 207a, 207b may be of any type including but not limited to a microprocessor (µP), a microcontroller (µC), a digital signal processor (DSP), or any combination thereof.

Depending on the desired configuration, system memory 210a, 20b may be of any type including, but not limited to, volatile memory (such as RAM), non-volatile memory (such as ROM, flash memory, etc.) or any combination thereof. System memory 210a, 210b can include an operating system 220a, 220b, one or more applications 225a, 225b, and program data 230a, 230b. Application 225a, 225b can include algorithms, for example algorithms for image and/or video size manipulation, resolution change and/or optimization, clipping, applications, for example applications for video chat applications, applications for image and/or video manipulation, application programming interfaces (APIs), libraries, for example, Open Graphics Library (Open GL) and video chat libraries, for example, Android Video Chat Library (vclib), which are arranged to perform the functions as, described herein including those described with respect to the processes of FIG. 3-6, which are discussed below. Program data 230a, 230b can include the data that can be useful for operation of the algorithms, applications, and/or libraries, as is described herein. In implementations, application 225a, 225b can be arranged to operate with program data 230a, 230b on operating system 220a, 220b such that implementations of the video chat encoding may be provided as described herein.

Devices 105 and 110 can communicate directly with each other through communication module 235a, 235b and transceivers 245a, 245b. For example, devices 105 and 110 can be operable to communicate using one or more wireless communication protocols. The wireless communication protocols can include near-field protocols, for example, but not limited to, Bluetooth, near-field communication (NFC), infrared and/or wide area protocols, for example, but not limited to, cellular, WiFi, WiMAX. Other suitable communication protocols can also be used. Devices 105 and 110 include a camera 240a, 240b, respectively, that are operable to provide image and/or video data to the video chat application.

Figure 3:
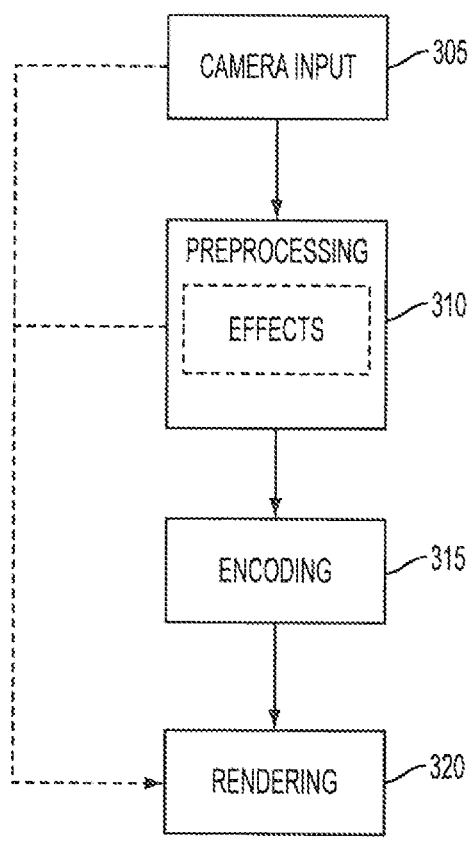
FIG. 3 shows an example video chat encoding pipeline according to implementations of the present disclosure.

FIG. 3 shows an example video chat encoding pipeline according to implementations of the present disclosure. At 305, input from the camera is obtained. For example, once the video chat application is started, an application programming interface (API) on device 105 can be invoked to control operation of camera 115. The API, stored in system memory 210a, 210b, respectively, can be a video chat library that is operable to work in conjunction with the GPU 207a, 207b, respectively, to perform most, if not all, of the processing for the video chat encoding. The API can be operable to place camera 115 in a preview mode. The API can be operable to manage the camera hardware to set image capture settings, start/stop preview, snap pictures, and retrieve frames for encoding for video. The API can be operable to determine the optical camera resolution to use based on possible later outcomes and will use that to start the camera preview. In implementations, once the preview is running, changing effects or output sizes usually cannot result in a change to the camera parameters, since doing so requires stopping and re-starting the camera preview. Therefore changes can be made to the intermediate frame buffers.

Frames from the camera can be provided as one or more frame buffers stored in one or more memory buffers or as a texture, which is generally represented as a one-, two- or multi-dimensional array of data items used in the calculation of the color or appearance of fragments produced by rasterization of a computer graphics image. In implementations, a buffer can be loaded into a texture (also known as a Frame Buffer Object in OpenGL (Open Graphics Library)) by the camera driver. In other implementations, the application can take the buffer from the camera and load the buffer into a texture for processing. A texture may be used to represent image data (either photographic or computer generated), color or transparency data, roughness/smoothness data, and/or reflectivity data. Textures are used to store various parameters such as transparency, reflectivity, and/or bumpiness for a rendering pipeline. The texture can use a pixel format that is defined by the graphics and camera drivers, and from the perspective of API, is opaque. For example, in the Android operating system, which can use Open GL, the texture can be a SurfaceTexture, which is an object that captures frames from an image stream as an OpenGL ES texture. The image stream may come from either camera preview or video decode. The SurfaceTexture can specify the output destination of a camera object, which can cause all the frames from the image stream to be sent to the SurfaceTexture object rather than to the device's display.

The texture can expose a transformation matrix that must be applied to the frame. In implementation using the Android platform, the cameras are operable to supply data directly into a SurfaceTexture. This transformation matrix may be used by some camera drivers to subsample an input buffer, and is also used to mirror the preview image when using a front-facing camera. Further, the transform matrix can be operable to perform a vertical flip of the image. For example, in Open GL, the GL textures define 0,0 (origin) as the bottom-left, so the vertical flip has the effect of orienting the texture 'right-side up', where (0,0) refers to the bottom-left of the image and (+x,+y) refers to the top right. Lastly, the transformation matrix can contain the rotation information to compensate for the orientation of the device. For example, in an Android implementation, the rotation information passed to variable "setDisplayOrientation" can be set to 0, which is allows the device orientation compensation to be performed in the pre-processing stage at 310. For the variable setDisplayOrientation, the clockwise rotation of the preview display is set in degrees. This affects the preview frames and the picture displayed after snapshot. This method is useful for portrait mode applications. Typically, the preview display of front-facing cameras is flipped horizontally before the rotation, that is, the image is reflected along the central vertical axis of the camera sensor. So the users can see themselves as looking into a mirror.

At 310, the preprocessing is performed. In implementations, the preprocessing stage can use a GL fragment shader to sample the camera's SurfaceTexture and color-convert to RGB while rotating and, if appropriate, flipping the image. The camera captures in landscape orientation regardless of how the device is being held, so if the device is being held in portrait orientation, this stage will rotate the image by 90 degrees. If the image is from a front-facing camera, the camera has already provided a mirror in the supplied transformation matrix, the preprocessing stage reverses that so that the output of this stage is non-mirrored. In implementations, the preprocessing stage can be operable to vertically flip the incoming image so that the top-left of the image is at origin (0,0). For example, this can be useful for face-detection-based effects. The preprocessing can include an effects stage, which is optional, but is to support processing of the outgoing video stream for the purpose of applying effects such as image stabilization or funny face filters. In implementations, each input frame to the preprocessing stage can produce zero or one or more than one output frame.

There are two general operations that can happen to the dimensions between the camera and the final output (ignoring rotation for the moment): the image can be scaled, or clipped. Clipping happens because of aspect ratio changes. For example, the camera might support 640×480 (4:3) but the output size might be 320×200 (16:10). In this case, the image is will be ultimately scaled down to ½ the input size (640×480 to 320×240), and then ⅙ of the vertical pixels will need to be clipped, cutting half from top and half from bottom (320×240 to 320×200). Clipping can be performed only in the encoding and rendering to screen stages. The image can be completely unclipped until then, though it may be scaled. The reasoning behind this has to do with effects that clip-image stabilization or virtual camera operator, for example, might well focus on an area that would have otherwise been clipped out, and a better result is possible by allowing those effects full access to the source image.

At 315, the encoding is performed. The encoding stage takes the preprocessed camera frame or effect output frame and color-converts to YUV planar 4:2:0 using fragment shaders, then reads the YUV data into main memory and hands the frames to the software encoder for compression, packetization, and transmission. The color conversion to YUV uses two frame buffers, one for the luminance plane, and a second for the subsampled chroma plane.

At 320, the rendering the self-view to the screen is performed. Rendering to the screen is performed by the particular video chat or conferencing application being used, which takes as its source the preprocessed camera frame or effect output. If the image is from the camera, a re-mirror operation can be performed to the image so that the self view appears mirrored on the device. In implementations, the rendering can be performed after a variety of processing, including, but not limited to, after the camera input 305 or after the preprocessing 310, which is shown in FIG. 3 with the dotted line.

Figure 4:
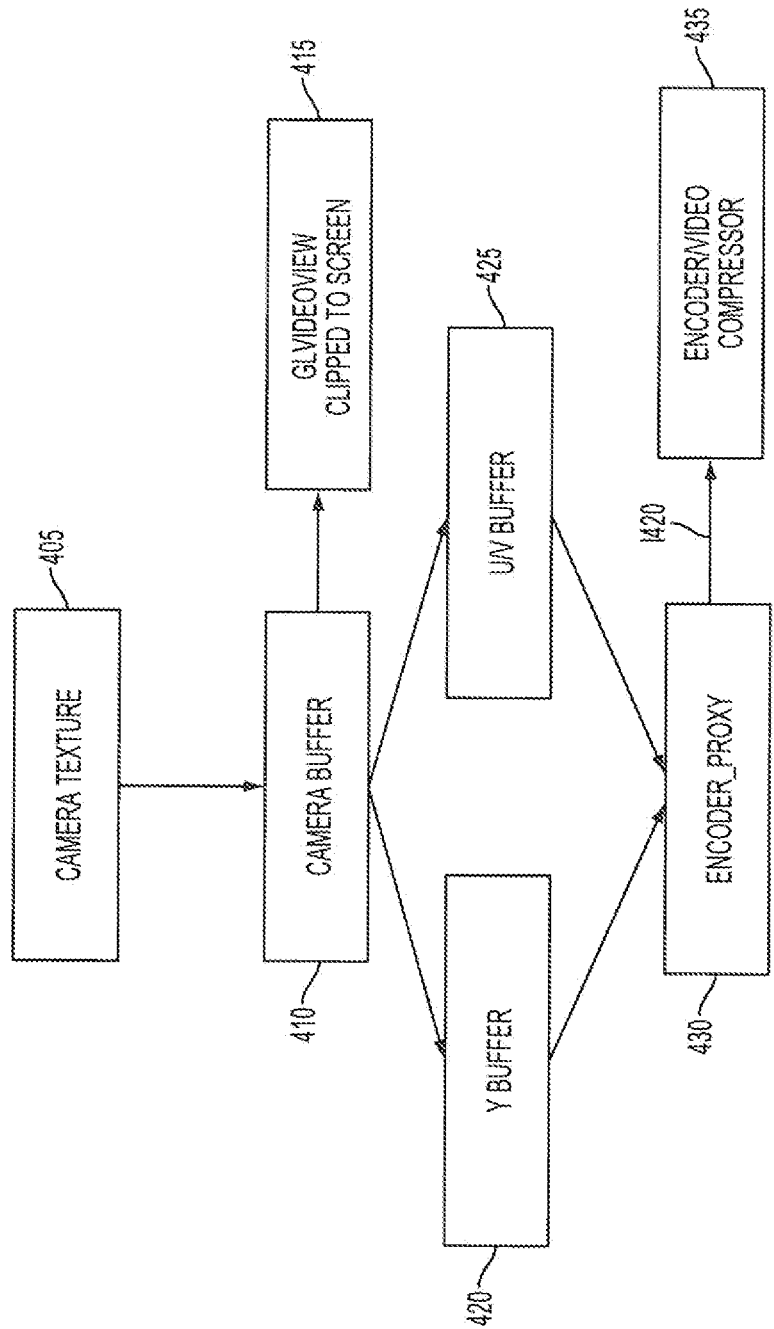
FIG. 4 shows an example encoding chain with no effect according to implementations of the present disclosure.

FIG. 4 shows an example encoding chain with no effects according to implementations of the present disclosure. In this example, the resolutions used for the input video (640×480) and the output video (480×300) are merely exemplary. Other resolution can be used. At 405, camera texture, for example, in an opaque format and at a resolution of 640×480, is obtained from camera of the first device. Opaque format, in the context of the present disclosure, is a format that is proprietary to a hardware vendor that manufactures the camera module and whose details are unknown to the operating system and the applications running on top of it. Image/video content in such format is passed blindly to the GPU, which decodes it using an API, or other suitable program code, provided by the hardware vendor. The opaque format of the camera texture in 405 is merely exemplary. Other pixel formats including, but not limited to, such as RGB and YUV can be used.

At 410, the one or more image processing algorithms, in combination with the GPU, can be operable to convert the camera texture from the opaque format to an ARGB color space, reduces the resolution from 640×480 to 480×360, and stores the converted camera texture in a camera or frame buffer. Again, the use of the opaque format is merely one example implementation. At 415, the converted camera texture is reduced in size, using a clipping procedure, to 480× 300, which is then provided in a suitable format to be viewed on the display of the first device. For example, the converted camera texture stored in the camera or frame buffer at 410 can be provided to the display using a VideoView class, which can load images from various sources (such as resources or content providers) and can compute its measurement from the video so that it can be used in any layout manager to provide various display options, such as scaling and tinting. The resolution and color space of the output texture is then changed to a YUV color space at 420 and 425. At 420, the output texture is provided to a Y buffer, which is operable to convert the ARGB color space to a YUV color space (120×300 ARGB=480×300 YYYY). At 425, the output texture is provided to a U/V or UV buffer, which is operable to convert the ARGB color space to a YUV color space (60×300 ARGB=480×300 4:2:0 planar). At 430, the converted output texture in YUV color space is provided to a proxy encoder. The proxy encoder is operable to read the two buffers (420 and 425) from the GPU graphics memory into a single buffer in main memory and to provide the single buffer to the encoder/video compressor. At 435, the output texture in, for example the 1420 format, is provided to an encoder/video compressor, which is operable to prepare the texture for transmission over a network to be viewed on another device. For example, the encoder/video compressor can compress the texture using one or more compression algorithms and format the texture into one or packets using a suitable packet forming protocol for transmission over the network.

Figure 5:
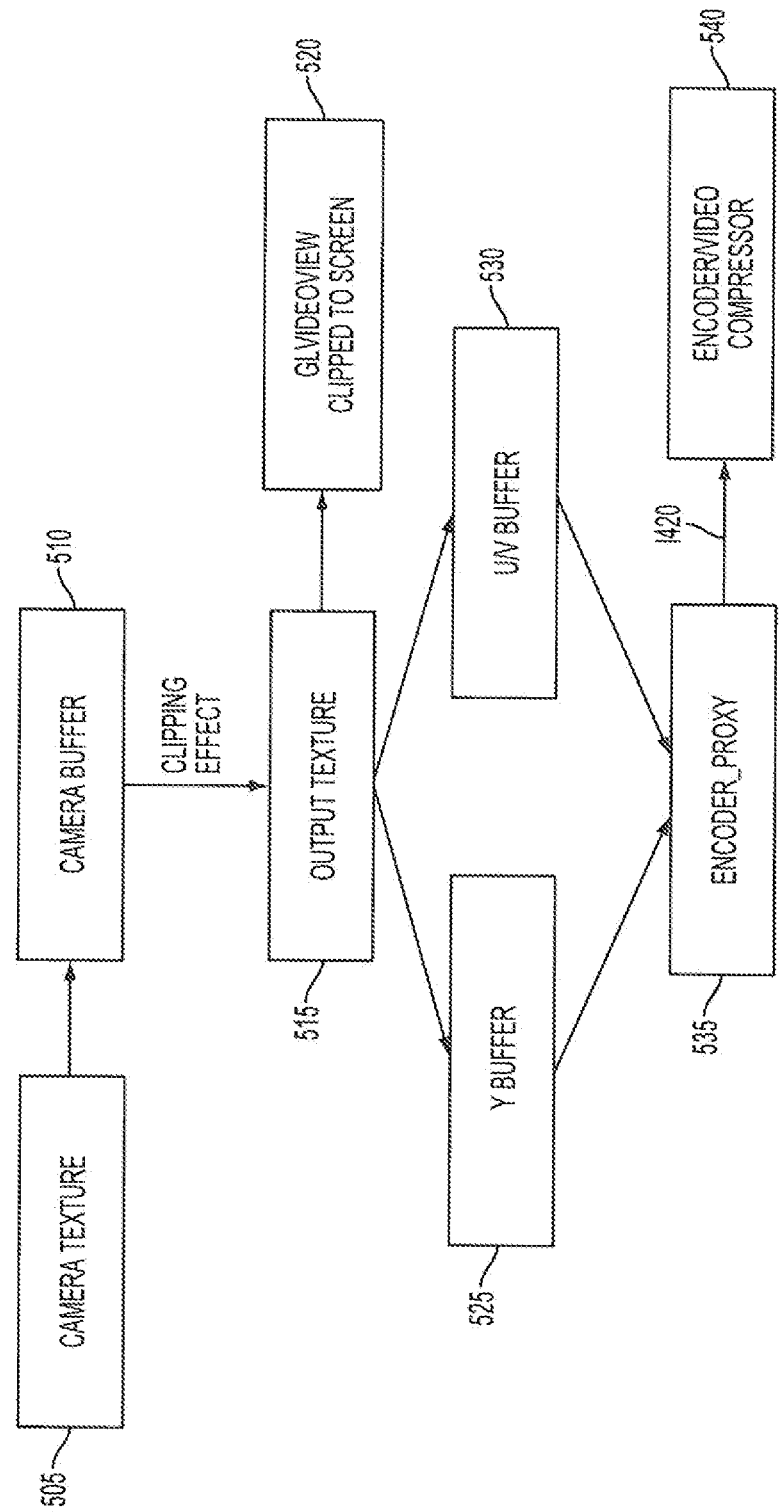
FIG. 5 shows another example encoding chain with a clipping effect according to implementations of the present disclosure.

FIG. 5 shows another example encoding chain with a clipping effect according to implementations of the present disclosure. In this example, a input resolution of 640×480 and an output resolution of 320×200 is used. However, as noted above, these are merely examples and other resolutions can be used. At 505, camera texture, for example, in an opaque format and at a resolution of 640×480, is obtained from camera of the first device. As discussed in relation to FIG. 4, the opaque format of the camera texture in 505 is merely exemplary. Other pixel formats including but not limited to, such as RGB and YUV can be used. At 510, the one or more image processing algorithms, in combination with the GPU, converts the camera texture from the opaque format to an ARGB color space and stores the converted camera texture in a camera or frame buffer at the same resolution of 640×480. At 515, the GPU reduces the resolution of the converted camera texture by changing the converted camera texture resolution from 640×480 to 320×240. Then, the GPU stores the reduced camera texture as an output texture in a camera or frame buffer. Then, the GPU further reduces the size of the output texture by performing a clipping procedure, which reduces the output texture from 320×240 to 320×200, which is then provided in a suitable format to be viewed on the display of the first device at 520. The resolution and color space of the output texture is then changed to a YUV color space at 525 and 530. At 525, the output texture is provided to a Y buffer, which is operable to convert the ARGB color space to a YUV color space (80×200 ARGB=320×200 YYYY). At 530, the output texture is provided to a U/V or UV buffer, which is operable to convert the ARGB color space to a YUV color space (40×200 ARGB=320×200 4:2:0 planar). At 535, the converted output texture in YUV color space is provided to a proxy encoder. The proxy encoder is operable to read the two buffers (525 and 530) from the GPU graphics memory into a single buffer in main memory and to provide the single buffer to the encoder/video compressor. At 540, the output texture in, for example, the 1420 format is provided to an encoder/video compressor, which is operable to prepare the texture for transmission over a network to be viewed on another device. For example, the encoder/video compressor can compress the texture using one or more compression algorithms and format the texture into one or packets using a suitable packet forming protocol for transmission over the network.

Figure 6:
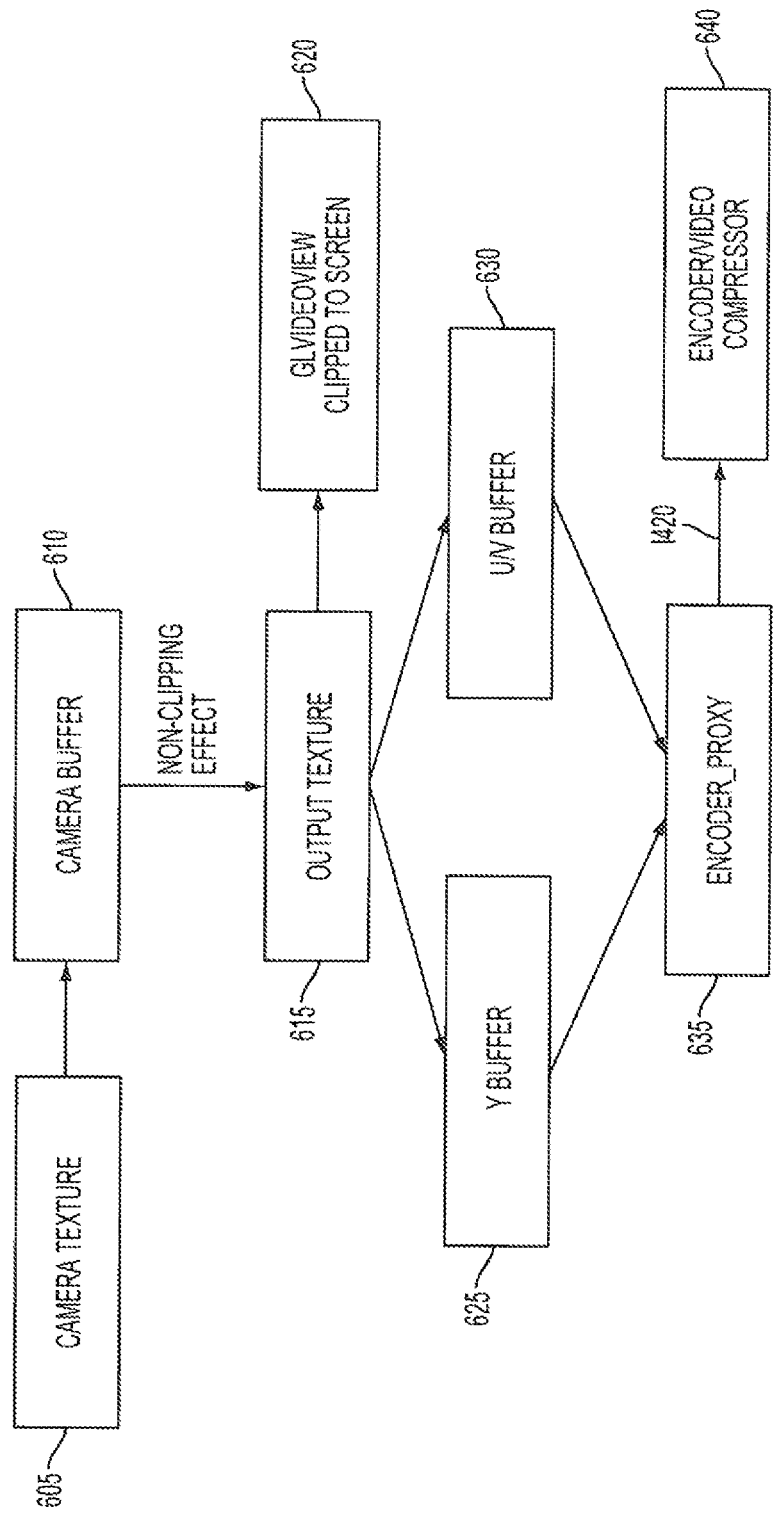
FIG. 6 shows another example encoding chain with a non-clipping effect according to implementations of the present disclosure.

FIG. 6 shows another example encoding chain with a non-dipping according to implementations of the present disclosure. As noted above, the input resolution of 640×480 and the output resolution of 320×200 used is merely an example. Other resolutions can be used. At 605, camera texture, for example, in an opaque format and at a resolution of 640×480, is obtained from camera of the first device. Again, as discussed in relation to FIG. 4, the opaque format of the camera texture in 405 is merely exemplary. Other pixel formats including, but not limited to, such as RGB and YUV can be used. At 610, the one or more image processing algorithms, in combination with the GPU, converts the camera texture from the opaque format to an ARGB color space and converts the camera texture from a resolution of 640×480 to a resolution of 320×240, which is stored as the converted camera texture in a camera or frame buffer. At 615, the GPU provides the converted camera texture as an output texture in a camera or frame buffer. Then, the GPU reduces the size of the output texture by performing a clipping procedure, which reduces the output texture from 320×240 to 320×200, which is then provided in a suitable format to be viewed on the display of the first device at 620. The resolution and color space of the output texture is then changed to a YUV color space at 625 and 630. At 625, the output texture is provided to a Y buffer, which is operable to convert the ARGB color space to a YUV color space (80×200 ARGB=320×200 YYYY). At 630, the output texture is provided to a U/V or UV buffer, which is operable to convert the ARGB color space to a YUV color space (40×200 ARGB=320×200 4:2:0 planar). At 635, the converted output texture in YUV color space is provided to a proxy encoder. The proxy encoder is operable to read the two buffers (625 and 630) from the GPU graphics memory into a single buffer in main memory and to provide the single buffer to the encoder/video compressor. At 640, the output texture in, for example, the 1420 format is provided to an encoder/video compressor, which is operable to prepare the texture for transmission over a network to be viewed on another device. For example, the encoder/video compressor can compress the texture using one or more compression algorithms and format the texture into one or packets using a suitable packet forming protocol for transmission over the network.

In implementations, the first set of luminance values can be encoded in an RGB color space and the second set of luminance values can be encoded in YUV color space with a pixel including four bands to store intensity values. Many GPUs do not native support for YUV frame buffers. Typically, they support various RGB and greyscale formats (e.g., 24-bit RGB, 32-bit ARGB, 8-bit greyscale, 16-bit alpha+luminance). In some implementations, the GPU can be operable to convert from RGB to YUV, where the YUV formats can be stored in ARGB frame buffers. By way of a non-limiting example, a 480×300 image in RGB space can be converted to a 4:2:0 YUV space. In this case, a 480×300 Y (luma) plane is needed, since the Y is not subsampled. Also, a 240×150 U plane and a 240×150 V plane are needed.

Continuing with the example above, two frame buffers can be created, where one frame buffer is for Y that is ARGB 120×300, and another frame buffer, for both U and V together, that is ARGB 60×300. The reason the pixel format is ARGB is just so that 32 bits per pixel is achieved, and not to store actual ARGB data. Since four (4) values (bytes) per pixel are being stored, the Y plane is 120 (wide)×300 (high), where each of the 120 pixels in a row store 4 Y pixels, so that represents a 480×300 set of Y values. Since, in this example, a planar pixel format is used, U and V are stored on top of each other, where the 'top' 60×150 pixels of the 60×300 chroma buffer are used to store U values (four U values per 'ARGB' pixel). So, 60×150 32-bit pixels can store 240×150 U values). The 'bottom' 60×150 pixels can store the V values, which his 60×150 for U on top of 60×150 for V that yields a 60×300 frame buffer.

The present disclosure is not to be limited in terms of the particular implementations described in this application, which are intended as illustrations of various implementations. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Modern image processing and image analysis concern statistical likelihoods more than absolutes. They are statistical efforts to produce a desired state and/or result. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

While various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims.

What is claimed is:

1. A first device, having a first display and a first camera, operable to modify display information to be viewable on a second device having a second display comprising:
   at least one processor; and
   non-transitory computer readable medium comprising instructions that cause the at least one processor to perform a method comprising:
      receiving video information including a source image frame from the first camera of the first device and storing the source image frame in a first buffer;
      receiving information related to a video format for displaying the video information on the second display of the second device;
      converting the video information to the video format by:
         converting a resolution of the source image frame to produce a first intermediate image frame and storing the first intermediate image frame in a second buffer;
         converting a size of the first intermediate image frame to produce a second intermediate image frame and storing the second intermediate image frame in a third buffer; and
         converting a first color space format comprising a luminance conversion and a chrominance conversion by receiving the second intermediate image frame and converting a first set of luminance values and a first set of chrominance values of the second intermediate image frame to a second color space format having a second set of luminance values and a second set of chrominance values and storing one or more luminance values for the luminance conversion in a fourth input frame buffer and storing one or more chrominance values for the chrominance conversion in a fifth input frame buffer; and
      transmitting video in the video format.

2. The device according to claim 1, wherein the converting comprises:
   converting the resolution of the source image frame obtained from the first camera from a first resolution to a second resolution to produce the first intermediate image frame at the second resolution;
   converting a first image size of the first intermediate image frame to a second image size to produce the second intermediate image;
   converting the first color space format of the second intermediate image to the second color space format to produce a third intermediate image; and
   encoding the third intermediate image for transmission to the second device.

3. The device according to claim 2, wherein the first color space format is RGB and the second color space format is YUV.

4. The device according to claim 1, further comprising:
   converting the resolution of the source image frame obtained from the first camera from a first resolution to a second resolution to produce the first intermediate image frame at the second resolution;
   converting a first image size of the first intermediate image frame to a second image size to produce the second intermediate image; and
   providing the second intermediate image to the first display for viewing on the first device.

5. The device according to claim 1, wherein the video format is provided based on information related to one or more display capabilities of the second display.

6. The device according to claim 5, wherein the information includes display resolution capabilities of the second display.

7. A non-transitory computer readable storage medium comprising instruction that cause one or more processors to perform a method for modify display information on a first device having a first display to be viewable on a second device having a second display comprising:
    receiving video information including a source image frame from a first camera of the first device and storing the source image frame in a first buffer;
    receiving information related to a video format for displaying the video information on the second display of the second device;
    converting the video information to the video format by:
        converting a resolution of the source image frame to produce a first intermediate image frame and storing the first intermediate image frame in a second buffer;
        converting a size of the first intermediate image frame to produce a second intermediate image frame and storing the second intermediate image frame in a third buffer; and
        converting a first color space format comprising a luminance conversion and a chrominance conversion by receiving the second intermediate image frame and converting a first set of luminance values and a first set of chrominance values of the second intermediate image frame to a second color space format having a second set of luminance values and a second set of chrominance values and storing one or more luminance values for the luminance conversion in a fourth input frame buffer and storing one or more chrominance values for the chrominance conversion in a fifth input frame buffer; and
    transmitting video in the video format.

8. The non-transitory computer readable storage medium according to claim 7, wherein the converting comprises:
    converting the resolution of the source image frame obtained from the first camera from a first resolution to a second resolution to produce the first intermediate image frame at the second resolution;
    converting a first image size of the first intermediate image frame to a second image size to produce the second intermediate image;
    converting the first color space format of the second intermediate image to the second color space format to produce a third intermediate image; and
    encoding the third intermediate image for transmission to the second device.

9. The non-transitory computer readable storage medium according to claim 8, wherein the first color space format and the second color space format comprise formats selected from the group consisting of: RGB, YUV, YUV 4:2:2 planar, YUV 4:2:0 planar, and YUV 4:4:4.

10. The non-transitory computer readable storage medium according to claim 7, further comprising:
    converting the resolution of the source image frame obtained from the first camera from a first resolution to a second resolution to produce the first intermediate image frame at the second resolution;
    converting a first image size of the first intermediate image frame to a second image size to produce the second intermediate image; and
    providing the second intermediate image to the first display for viewing on the first device.

11. The non-transitory computer readable storage medium according to claim 7, wherein the video format is provided based on information related to on one or more display capabilities of the second display.

12. The non-transitory computer readable storage medium according to claim 11, wherein the information includes display resolution capabilities of the second display.

13. A system for modifying display information on a first device to be viewable on a second device, the system comprising:
    memory operable to store computer-executable components;
    a processor operable to execute the computer-executable components stored within the memory, the computer-executable components comprising:
        converting a resolution of a source image frame from a first resolution to a second resolution to produce a first intermediate image frame at the second resolution;
        receiving the first intermediate image frame;
        converting a vertical or a horizontal image size of the first intermediate image frame to another vertical or another horizontal image frame size to produce a first viewable image frame;
        receiving and displaying the first viewable image frame from the image conversion component on a first display;
        performing a color space conversion comprising a luminance conversion and a chrominance conversion by receiving the first viewable image frame and converting a first set of luminance values and a first set of chrominance values of the first viewable image frame to a second intermediate image frame having a second set of luminance values and a second set of chrominance values; and
        encoding the second intermediate image frame in a format to be displayed on a second display,
    a first input buffer operable to store the source image frame;
    a second input buffer operable to store the first intermediate image frame;
    a third input frame buffer operable to store the first viewable image frame;
    a fourth input frame buffer operable to store one or more luminance values for the luminance conversion; and
    a fifth input frame buffer operable to store one or more chrominance values for the chrominance conversion.

14. The system according to claim 13, wherein the processor comprises a graphics processing unit.

15. The system according to claim 13, further comprising rotating the source image frame from a first orientation to a second orientation.

16. The system according to claim 13, wherein the first set of luminance values are encoded in an RGB color space and the second set of luminance values are encoded in YUV color space with a pixel including four bands to store intensity values.

17. The system according to claim 13, wherein the second display instructs the processor as to what format the encoder component encodes the second intermediate image frame.

18. The system according to claim 13, further comprising receiving the source image frame from a camera coupled to the first device operating in preview mode.

19. A system comprising:
    memory operable to store computer-executable components;
    a processor operable to execute the computer-executable components stored within the memory, the computer-executable components comprising:
        converting a vertical or a horizontal image size of a source image frame to another vertical or another horizontal image frame size to produce a first intermediate image frame;
        receiving the first intermediate image frame;

converting a resolution of the first intermediate image frame from a first resolution to a second resolution to produce a first viewable image frame at the second resolution;

receiving and displaying the first viewable image frame from the image resolution conversion component on a first display;

performing a color space conversion comprising a luminance conversion and a chrominance conversion by receiving the first viewable image frame and converting a first set of luminance values and a first set of chrominance values of the first viewable image frame to a second intermediate image frame having a second set of luminance values and a second set of chrominance values; and encoding the second intermediate image frame in a format to be displayed on a second display, a first input buffer operable to store the source image frame;

a second input buffer operable to store the first intermediate image frame;

a third input frame buffer operable to store the first viewable image frame;

a fourth input frame buffer operable to store one or more luminance values for the luminance conversion; and a fifth input frame buffer operable to store one or more chrominance values for the chrominance conversion.

20. The system according to claim 19, wherein the processor comprises a graphics processing unit.

21. The system according to claim 19, further comprising rotating the source image frame from a first orientation to a second orientation.

22. A computer-implemented method for modifying display information on a first device having a first display to be viewable on a second device having a second display, the method comprising:

receiving video including a source image frame from a first camera of the first device and storing the source image frame in a first buffer;

receiving information related to a video format for displaying the video information on the second display of the second device;

converting the video information to the video format by:
converting a resolution of the source image frame to produce a first intermediate image frame and storing the first intermediate image frame in a second buffer;
converting a size of the first intermediate image frame to produce a second intermediate image frame and storing the second intermediate image frame in a third buffer; and
converting a first color space format comprising a luminance conversion and a chrominance conversion by receiving the second intermediate image frame and converting a first set of luminance values and a first set of chrominance values of the second intermediate image frame to a second color space format having a second set of luminance values and a second set of chrominance values and storing one or more luminance values for the luminance conversion in a fourth input frame buffer and storing one or more chrominance values for the chrominance conversion in a fifth input frame buffer; and
providing video in the video format.

23. The computer-implemented method according to claim 22, wherein the converting comprises:
converting the resolution of the source image frame obtained from the first camera from a first resolution to a second resolution to produce the first intermediate image frame at the second resolution;
converting a first image size of the first intermediate image frame to a second image size to produce the second intermediate image;
converting the first color space format of the second intermediate image to the second color space format to produce a third intermediate image; and
encoding the third intermediate image for transmission to the second device.

24. The computer-implemented method according to claim 23, wherein the first color space format and the second color space format comprise formats selected from the group consisting of: RGB, YUV, YUV 4:2:2 planar, YUV 4:2:0 planar, and YUV 4:4:4.

25. The computer-implemented method according to claim 23, further comprising:
converting the resolution of the source image frame obtained from the first camera from a first resolution to a second resolution to produce the first intermediate image frame at the second resolution;
converting a first image size of the first intermediate image frame to a second image size to produce the second intermediate image; and
providing the second intermediate image to the first display for viewing on the first device.

26. The computer-implemented method according to claim 22, wherein the video format is provided based on information related to on one or more display capabilities of the second display.

27. The computer-implemented method according to claim 26, wherein the information related to a video format includes display resolution capabilities of the second display.

* * * * *